US 6,623,067 B2

(12) United States Patent
Gabbianelli et al.

(10) Patent No.: US 6,623,067 B2
(45) Date of Patent: Sep. 23, 2003

(54) DOOR SEAL INTERFACE STRUCTURE FOR A MOTOR VEHICLE SPACE FRAME

(75) Inventors: Gianfranco Gabbianelli, Troy, MI (US); Richard D. Ashley, Berkley, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 09/725,457

(22) Filed: Nov. 30, 2000

(65) Prior Publication Data

US 2001/0002760 A1 Jun. 7, 2001

Related U.S. Application Data

(60) Continuation-in-part of application No. 09/661,571, filed on Sep. 14, 2000, and a continuation-in-part of application No. 09/290,992, filed on Apr. 14, 1999, which is a division of application No. 09/173,554, filed on Oct. 16, 1998, now Pat. No. 6,092,865.
(60) Provisional application No. 60/062,204, filed on Oct. 16, 1997.

(51) Int. Cl.⁷ ............................ B62D 27/02; B62D 25/04
(52) U.S. Cl. ................... 296/205; 296/203.03; 296/29; 296/209; 296/203.01; 52/730.4; 52/735.1
(58) Field of Search ................ 296/29, 30, 202, 296/205, 209, 203.01, 203.02, 203.03; 72/60, 61; 52/735.1, 730.4

(56) References Cited

U.S. PATENT DOCUMENTS

| 1,293,871 A | * | 2/1919 | Murray | 285/288.2 |
| 1,581,931 A | | 4/1926 | Lamplugh | 296/205 |
| 1,846,567 A | | 2/1932 | Murray, Jr. | 280/796 |
| 2,149,844 A | * | 3/1939 | George | 403/178 |
| 2,269,451 A | | 1/1942 | Ford | 296/28 |
| 2,389,907 A | | 11/1945 | Helmuth | 296/28 |
| 2,668,722 A | | 2/1954 | Muller | 280/106 |

(List continued on next page.)

FOREIGN PATENT DOCUMENTS

| DE | 867059 | 2/1953 |
| DE | 4122862 | 1/1993 |
| DE | 19929219 | 12/2000 |
| EP | 0570150 A1 | 11/1993 |
| EP | 0733538 | 9/1996 |
| FR | 690842 | * 6/1930 ................. 296/205 |

(List continued on next page.)

OTHER PUBLICATIONS

"Lighter Car Body in Aluminum with Hydroforming Technology R&D Results," Hanicke et al., IBEC 96, Detroit, Oct. 1–3, 1996, Volvo Car Corporation.
International Application No. PCTR/CA 98/00962, PCT Search Report, mailed Feb. 17, 1999, Magna International Inc.

Primary Examiner—Joseph D. Pape
Assistant Examiner—Greg Blankenship
(74) Attorney, Agent, or Firm—Pillsbury Winthrop LLP

(57) ABSTRACT

A door seal interface structure for a motor vehicle space frame includes a longitudinally extending hydroformed tubular rail portion, a hydroformed tubular pillar portion connected at a joint to the rail portion and a transition structure. The rail portion and the pillar portion provide respective surface portions constructed and arranged to sealingly engage a door seal to seal a peripheral portion of a closed vehicle door. The pillar and rail surface portions are angularly related to one another in the vicinity of the joint. The transition structure is mounted on the rail portion and the pillar portion in the vicinity of the joint and provides a transition surface that provides a transition between the pillar and rail surfaces of the pillar and rail portions, the transition surface portion being constructed and arranged to sealingly engage a portion of the door seal to seal the closed vehicle door and thereby provide a door seal-engagable surface in the vicinity of the joint.

28 Claims, 7 Drawing Sheets

U.S. PATENT DOCUMENTS

| | | | |
|---|---|---|---|
| 3,159,419 A | 12/1964 | Kerby | 296/28 |
| 3,630,056 A | 12/1971 | Cuq | 72/28 |
| 3,971,588 A | 7/1976 | Bauer | 296/28 R |
| 4,217,970 A * | 8/1980 | Chika | 180/298 |
| 4,355,844 A | 10/1982 | Muzzarelli | 296/205 |
| 4,471,519 A | 9/1984 | Capello et al. | 29/460 |
| 4,618,163 A | 10/1986 | Hasler et al. | 280/785 |
| 4,648,208 A | 3/1987 | Baldamus et al. | 49/502 |
| 4,660,345 A | 4/1987 | Browning | 52/648 |
| 4,726,166 A | 2/1988 | DeRees | 52/694 |
| 4,735,355 A | 4/1988 | Browning | 228/189 |
| 4,759,111 A | 7/1988 | Cudini | 29/523 |
| 4,986,597 A | 1/1991 | Clausen | 296/205 |
| 5,031,933 A * | 7/1991 | Hirasawa et al. | 280/808 |
| 5,031,958 A | 7/1991 | Fujita et al. | 296/194 |
| 5,094,313 A | 3/1992 | Mauws | 180/210 |
| 5,094,504 A * | 3/1992 | Wurl | 296/203.03 |
| 5,095,655 A * | 3/1992 | Warren | 49/374 |
| 5,106,249 A | 4/1992 | Janotik | 411/43 |
| 5,116,161 A * | 5/1992 | Faisst | 403/231 |
| 5,209,541 A | 5/1993 | Janotik | 296/29 |
| 5,213,386 A | 5/1993 | Janotik et al. | 296/29 |
| 5,228,259 A | 7/1993 | Haddad et al. | 52/653.2 |
| 5,233,789 A | 8/1993 | Priest et al. | 49/360 |
| 5,233,856 A | 8/1993 | Shimanovski et al. | 72/62 |
| 5,269,585 A | 12/1993 | Klages et al. | 296/205 |
| 5,271,687 A | 12/1993 | Holka et al. | 403/233 |
| 5,318,819 A * | 6/1994 | Pai | 428/71 |
| 5,320,403 A | 6/1994 | Kazyak | 296/203 |
| 5,332,281 A | 7/1994 | Janotik et al. | 296/209 |
| 5,333,775 A | 8/1994 | Bruggemann et al. | 228/157 |
| 5,338,080 A | 8/1994 | Janotik et al. | 296/29 |
| 5,343,666 A | 9/1994 | Haddad et al. | 52/648.1 |
| 5,352,011 A * | 10/1994 | Kihara et al. | 296/203.03 |
| 5,370,438 A * | 12/1994 | Mori et al. | 296/203.03 |
| 5,372,400 A | 12/1994 | Enning et al. | |
| 5,382,071 A * | 1/1995 | Enning et al. | 296/203.03 |
| 5,458,393 A | 10/1995 | Benedyk | 296/203 |
| 5,460,026 A | 10/1995 | Schafer | 72/55 |
| 5,481,892 A | 1/1996 | Roper et al. | 72/61 |
| 5,518,209 A | 5/1996 | Chicoine et al. | 244/158 R |
| 5,527,583 A * | 6/1996 | Nozaki et al. | 296/146.9 |
| 5,549,352 A | 8/1996 | Janotik et al. | 296/209 |
| 5,561,902 A | 10/1996 | Jacobs et al. | 29/897.2 |
| 5,564,785 A | 10/1996 | Schultz et al. | 297/452.2 |
| 5,573,297 A * | 11/1996 | DeRees et al. | 296/146.6 |
| 5,577,796 A | 11/1996 | Clausen | 296/202 |
| 5,581,947 A | 12/1996 | Kowall et al. | 49/451 |
| 5,582,052 A | 12/1996 | Rigsby | 72/62 |
| 5,600,983 A | 2/1997 | Rigsby | 72/61 |
| 5,641,176 A | 6/1997 | Alatalo | 280/690 |
| 5,649,735 A | 7/1997 | Tomforde et al. | 296/71 |
| 5,671,968 A * | 9/1997 | Masuda et al. | 296/188 |
| 5,673,929 A | 10/1997 | Alatalo | 280/690 |
| 5,693,419 A * | 12/1997 | Nozaki | 428/354 |
| 5,718,048 A | 2/1998 | Horton et al. | 29/897.2 |
| 5,720,092 A | 2/1998 | Ni et al. | 29/421.1 |
| 5,720,511 A | 2/1998 | Benedyk | 296/203 |
| 5,725,924 A * | 3/1998 | Keys | 296/146.7 |
| 5,765,906 A | 6/1998 | Iwatsuki et al. | 296/203 |
| 5,794,398 A | 8/1998 | Kaehler et al. | 52/653.2 |
| 5,800,003 A | 9/1998 | Clenet | 296/29 |
| 5,845,382 A | 12/1998 | Schultz et al. | 29/421.1 |
| 5,848,853 A | 12/1998 | Clenet | 403/272 |
| 6,073,992 A * | 6/2000 | Yamauchi et al. | 296/203.01 |
| 6,092,865 A | 7/2000 | Jaekel et al. | 296/205 |
| 6,142,506 A * | 11/2000 | Patel et al. | 296/189 |
| 6,205,736 B1 * | 3/2001 | Amborn et al. | 52/633 |
| 6,293,617 B1 | 9/2001 | Sukegawa | |
| 6,322,135 B1 * | 11/2001 | Okana et al. | 296/203.03 |

FOREIGN PATENT DOCUMENTS

| | | | | |
|---|---|---|---|---|
| FR | 694774 | | 12/1930 | |
| GB | 22366 | * | 10/1896 | 296/205 |
| JP | 56-142761 A | * | 11/1981 | 296/209 |
| JP | 58-161613 A | * | 9/1983 | 296/202 |
| JP | 3-224872 A | * | 10/1991 | 296/209 |
| JP | 4-11581 | | 1/1992 | |
| JP | 4-11581 A | * | 1/1992 | 296/205 |
| JP | 4-129886 A | * | 4/1992 | 296/209 |
| JP | 4-215574 A | * | 8/1992 | 296/209 |
| JP | 5-286457 A | * | 11/1993 | 296/209 |
| WO | WO97/00595 | | 1/1997 | |

* cited by examiner

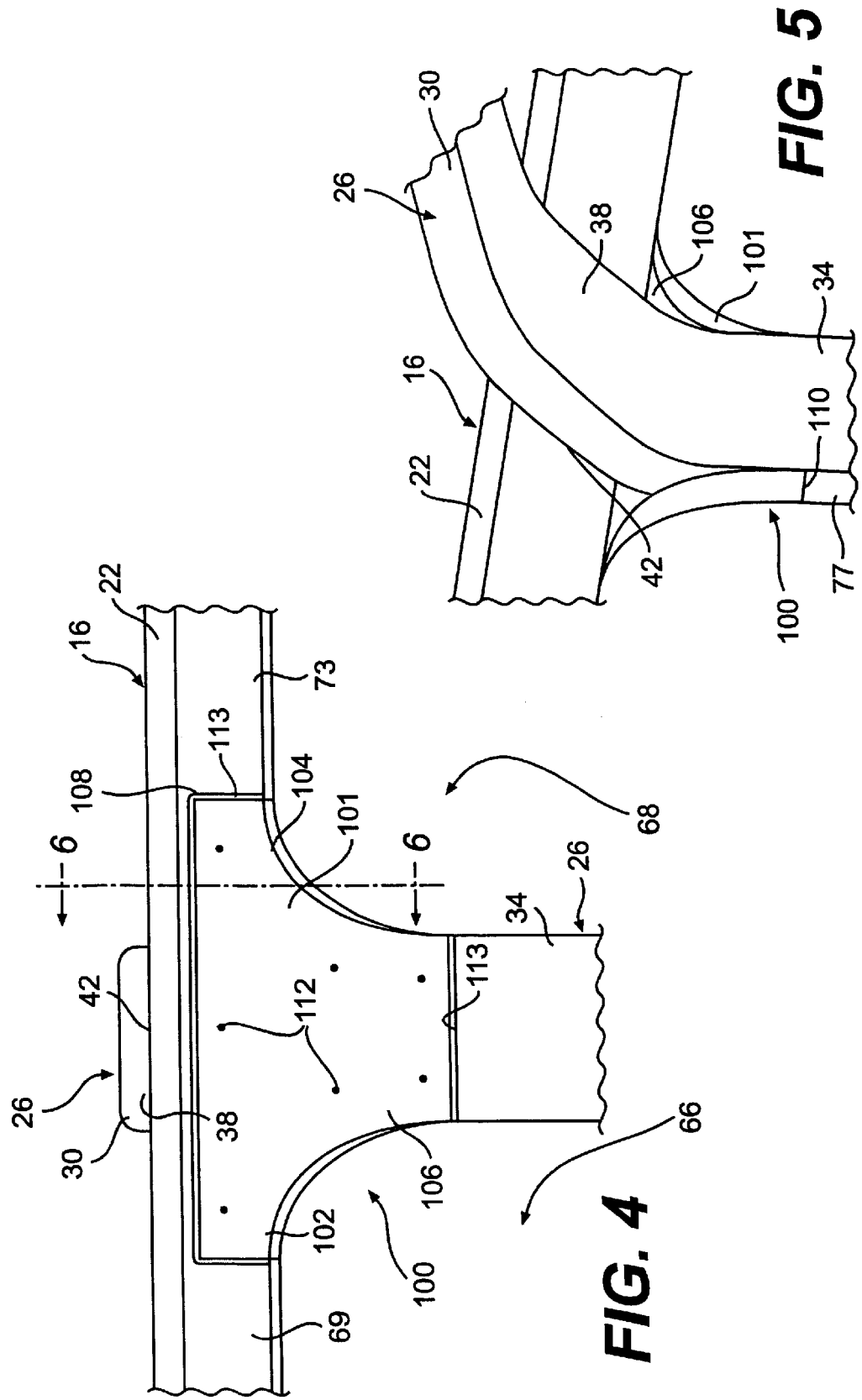

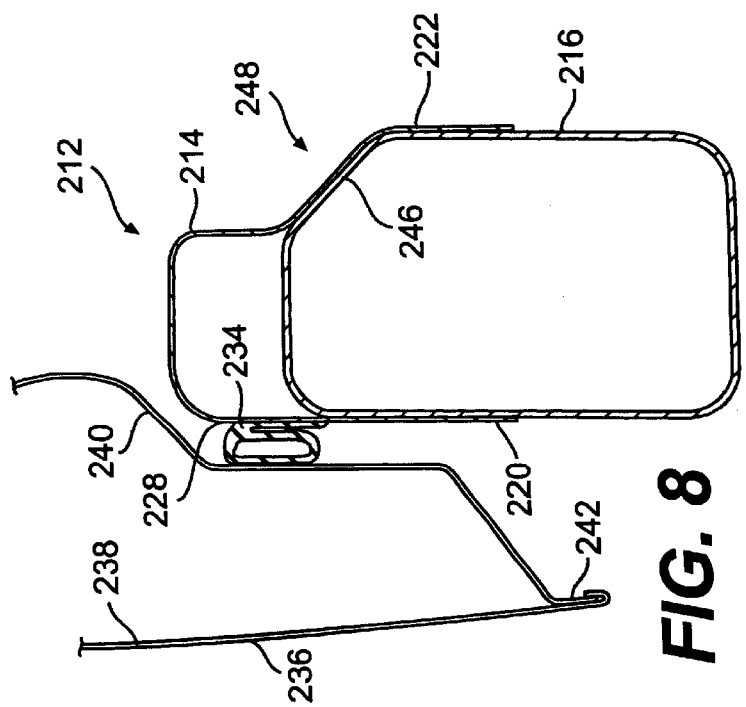
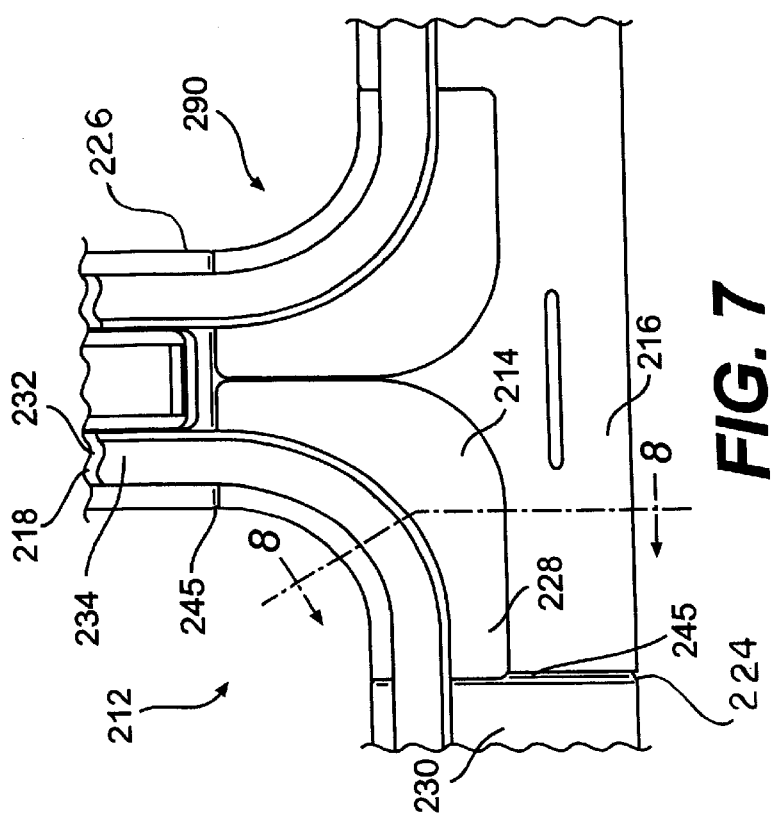

DOOR SEAL INTERFACE STRUCTURE FOR A MOTOR VEHICLE SPACE FRAME

This application is a continuation-in-part of Ser. No. 09/661,571 filed Sep. 14, 2000, and a continuation-in-part of Ser. No. 09/290,992 filed Apr. 14, 1999, which is a division of Ser. No. 09/173,554, filed Oct. 16, 1998 originally filed Oct. 16, 1997 as Ser. No. 60/062,204 and now issued as U.S. Pat. No. 6,092,865, each of which is hereby incorporated by reference in its entirety.

FIELD OF THE INVENTION

The present invention is generally related to motor vehicle space frames and more particularly to a door seal interface structure for providing a door seal-engagable surface between a pair of space frame members in the vicinity of a joint therebetween.

BACKGROUND OF THE INVENTION

Space frame architecture is increasingly being used in vehicle construction. Space frames are cage-like structures constructed of a plurality of elongated structural components connected together at joints. The vehicle is assembled by mounting other vehicle components, such as vehicle body panels, on the space frame.

Vehicle doors are usually mounted on each side of the vehicle for pivotal movement between open and closed positions with respect to a door opening. Each door of a contemporary vehicle has a continuous peripheral door seal typically constructed of a resilient rubber-like material that sealingly engages a corresponding surface or surfaces surrounding the associated door opening when the door is closed. The door seal acts as a barrier which seals the vehicle passenger compartment when the door is closed, thereby protecting the vehicle occupants and the vehicle interior from outside weather conditions, noise, pollution and so on.

Vehicle space frames are often provided with several longitudinally spaced pairs of corresponding laterally spaced, essentially vertically extending pillar structures. These include a forward-most pair of pillar structures (constituting the "A" pillars), one or more pairs of intermediate pillar structures (e.g., the "B" pillars) and a pair of rearward-most pillar structures (e.g., the "C" or "D" pillars). The vehicle door may be pivotally mounted on a pillar structure by a pair of hinges for movement between open and closed positions. In the closed position, each door may be received between adjacent pillar structures on one side of the space frame.

Space frames can advantageously be constructed using tubular hydroformed components. A space frame can be constructed such that the pairs of pillar structures and the side rails are hydroformed. An advantage of using hydroforming technology to construct a space frame is that it can provide greater dimensional accuracy as described in the above incorporated U.S. Pat. No. 6,092,865, entitled HYDROFORMED SPACE FRAME AND METHOD OF MANUFACTURING THE SAME. To help achieve this benefit, it is advantageous to form as few connections as possible, and to connect hydroformed members directly to one another with no intervening connecting member. In general, the fewer connections made, the less the amount of tolerance variation build-up.

In the instance in which it may be desirable to mount the vehicle door directly to a hydroformed pillar, as in the above-incorporated application, the pillar and the adjoining hydroformed side rail may be used to directly engage a portion of the resilient seal formed around the periphery of the door. In the vicinity of the joint between directly connected hydroformed rail and pillar portions, however, a relatively sharp angular relation exists (e.g., orthogonal) between the parts and, therefore, does not provide suitable transition surface (e.g., an arcuate transition surface) to accommodate a door seal. Similar door seal issues exist toward the top corners of the door opening, at which the pillars are connected to an upper longitudinal rail. There is a need for a space frame that takes advantage of the benefits of hydroforming while providing a transition surface between the door seal engaging surface of each pillar and the door seal engaging surface of the adjoining rail.

SUMMARY OF THE INVENTION

To meet the need identified above, the present invention provides a door seal interface structure for a motor vehicle space frame, the door seal interface structure comprising a longitudinally extending hydroformed tubular rail portion and a hydroformed tubular pillar portion connected at a joint to the rail portion. The rail portion and the pillar portion provide respective surfaces that sealingly engage a door seal to seal a closed vehicle door. The rail portion and the pillar portion surfaces are angularly related to one another in the vicinity of the joint. A transition structure is mounted on the rail portion and the pillar portion in the vicinity of the joint. The transition structure provides a transition surface that provides a transition between the rail portion and pillar portion surfaces. The transition surface portion sealingly engages a portion of the door seal to seal the closed vehicle door and thereby provides a door seal-engagable surface in the vicinity of the joint.

Other aspects, features, and advantages of the present invention will become apparent from the following detailed description, the accompanying drawings, and the appended claims.

BRIEF DESCRIPTION OF THE DRAWINGS

FIG. 4 is an exterior side elevational view of another embodiment of a door seal interface structure mounted on the space frame;

FIG. 5 is an interior perspective view of the door seal interface structure of FIG. 4;

FIG. 7 is a view similar to the view if FIG. 2 showing another embodiment of a pair of door seal interface structures of a space frame;

FIG. 8 is a cross-sectional view taken through the line 8—8 in FIG. 7;

DETAILED DESCRIPTION OF THE BEST MODE AND PREFERRED EMBODIMENT

Figure 1:
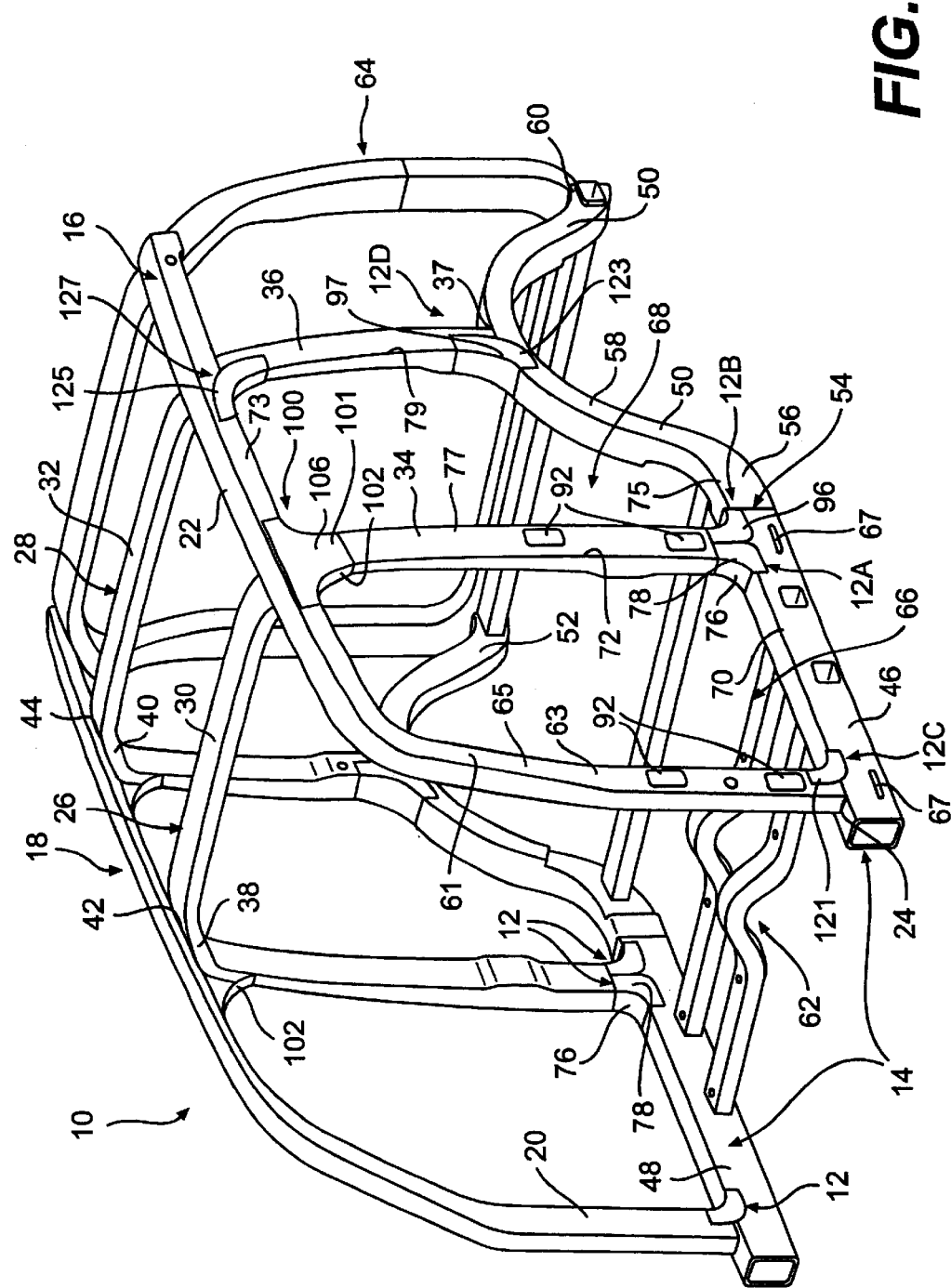
FIG. 1 is a perspective view of a space frame having a plurality of door seal interface structures constructed according to the principles of the invention mounted thereon.

FIG. 1 shows a motor vehicle space frame generally designated 10 for a sports utility-type vehicle. The space frame 10 includes a plurality of door seal interface structures generally designated 12 constructed according to the principles of the present invention.

The space frame 10 includes a pair of side rail structures 14 and a pair of hydroformed tubular upper longitudinal members 16, 18. The upper longitudinal members 16, 18 are of mirror image construction so only member 16 will be discussed in detail, but the discussion applies equally to upper longitudinal member 18. The upper longitudinal member 16 includes a pillar portion 20 and an integral longitudinally extending upper rail portion 22. Each pillar portion 20 is connected to a respective side rail structure 14 at a joint 24 and extends upwardly therefrom to form a forward-most or "A" pillar thereon. Each longitudinally extending rail portion 22 provides a roof-supporting rail on the space frame 10.

Two pairs of intermediate pillars are provided by a pair of tubular hydroformed U-shaped cross members 26, 28. Each cross member 26, 28 includes a cross portion 30, 32, respectively, and a pair of pillar-forming leg portions or pillar portions 34, 36, respectively, extending integrally from respective junctures 38, 40 at opposite ends of the respective cross portions 30, 32. Each leg portion 34, 36 of each U-shaped cross member 26, 28 is connected at a free end thereof to a respective main side rail structure 14 at respective joints 39 (indicated in dashed lines in FIG. 2), 37 (partially visible in FIG. 1) therewith and extends upwardly therefrom. Each juncture 38, 40 is connected to the longitudinally extending portion 22 of the associated upper longitudinal member, 16, 18 at joints 42, 44, respectively, preferably by welding. The pillar-forming leg portions 34, 36 of the hydroformed cross members 26, 28 form the B and C pillars, respectively.

Preferably each main side rail structure 14 is provided by a hydroformed forward main side rail member 46, 48, respectively (on each side of the space frame) and a rear main side rail member 50, 52 connected thereto, respectively as shown. Alternatively, each main side rail structure 14 can be provided by a single integral hydroformed rail member (not shown). Each hydroformed tubular member (e.g., members 16, 18, 26, 28, 46, 48, 50, 52) is defined by an outwardly deformed tubular metallic wall fixed in a predetermined irregular exterior surface configuration, as formed in a conventional hydroforming process. The forward members 46, 48 are of mirror image construction and the rear members 50, 52 are of mirror image construction, so only members 46 and 50 are discussed in detail.

The forward side rail member 46 is connected to the rear side rail member 50 at joint 54. The second side rail member 50 has an essentially straight forward portion 56 which transitions into an upwardly arching intermediate wheel well-forming portion 58 which in turn transitions into an essentially straight rearward portion 60.

A plurality of laterally extending connecting structures generally designated 62 are connected between the main side rail structures 14 and hold the main side rail structures 14 in laterally spaced, fixed relation. The space frame 10 includes a hydroformed rearward ring assembly 64. The details of the structure of the connecting structures 62 and of the rearward ring assembly 64 and the manner in which the same are connected to the space frame 10 will not be considered in the present application but can be understood from an examination of the above incorporated commonly assigned '865 patent reference.

The space frame 10 generally defines two door openings 66, 68 on each side of the frame 10 for receiving a pair of vehicle doors 81 (the doors are not shown in FIGS. 1, 2, 4 and 5, but shown in fragmentary view in FIGS. 3 and 6–8, as will become apparent). Only the door openings on one side of the space frame 10 will be considered in detail, but the discussion applies to the door openings on the opposite side of the space frame, each of which is of mirror image construction to the corresponding door opening on the one side of the vehicle.

A front vehicle door (not shown in FIG. 1) is pivotally mounted on the pillar-forming portion 20 (the A pillar) of the upper longitudinal member 16 of the assembled vehicle by a pair of hinges (not shown) for door pivotal movement between open and closed positions with respect to door opening 66. Similarly a vehicle door (not shown in FIG. 1) is pivotally mounted on the pillar-forming leg portion 34 (the B pillar) of the hydroformed cross member 26 of the assembled vehicle by a pair of hinges 74 (one of which is shown schematically in dashed lines in FIG. 2) for door opening and closing with respect to door opening 68.

It can be understood from FIG. 1 that the door opening 66 is generally defined by the essentially vertically extending pillar portions 20, 34 of the hydroformed upper longitudinal member 16 and the hydroformed cross member 26, respectively, and by the essentially horizontally extending rail portion 22 of the hydroformed upper longitudinal side rail member 16 and the essentially horizontally extending hydroformed rail member 46.

The horizontal rail portions 22, 46 of the space frame 10 which help define the door opening 66 provide a pair of door seal-engagable surfaces 69 (see, for example, FIG. 4), 70 (see, for example, FIG. 1), respectively, which face generally outwardly from the door opening 66. Each surface 69, 70 sealingly engages a portion of a door seal of a closed front vehicle door 81 (shown in fragmentary view in FIG. 3). Similarly, the pillar portions 20, 34 provide a pair of generally outwardly facing, essentially vertical door seal-engagable surfaces 63, 72, respectively, which sealingly engage an essentially vertical portion of a door seal of the front closed vehicle door (e.g., see the generally outwardly facing surface 72 formed by an outwardly facing side portion of the pillar portion 34 in FIG. 1, for example).

It can also be understood that an upper part 65 of the pillar portion 20 is angled rearwardly and connected integrally to the longitudinally extending upper rail portion 22 of the upper longitudinal member 16. This integral construction provides smooth, continuous outwardly facing door seal-engagable transition surface 61 between the A pillar 20 and the longitudinally extending portion 22.

The rail portions 22, 50 of the space frame 10 which define the door opening 68 provide a pair of generally outwardly facing, essentially horizontal door seal-engagable surfaces 73 (see, for example, FIG. 4), 75 (see, for example, FIG. 1), respectively, which face generally outwardly from the door opening 68. Each surface 73, 75 sealingly engages an essentially horizontal portion of a door seal of a closed rear vehicle door. The pillar portions 34, 36 of the space frame 10 which define the door opening 68 provide a pair of generally outwardly facing, essentially vertical door seal-engagable surfaces 77 (see, for example, FIG. 1), 79 (see, for example, FIG. 1), respectively, which sealingly engage an essentially vertical portion of a door seal of the closed rear vehicle door 85 (shown in fragmentary view in FIG. 6). The arched portion 58 of the second hydroformed member 50 forms a generally outwardly facing door seal engageable rail surface 81 that is essentially perpendicular to the essentially vertical pillar portion of 36 in the vicinity of the joint 37.

Figure 2:
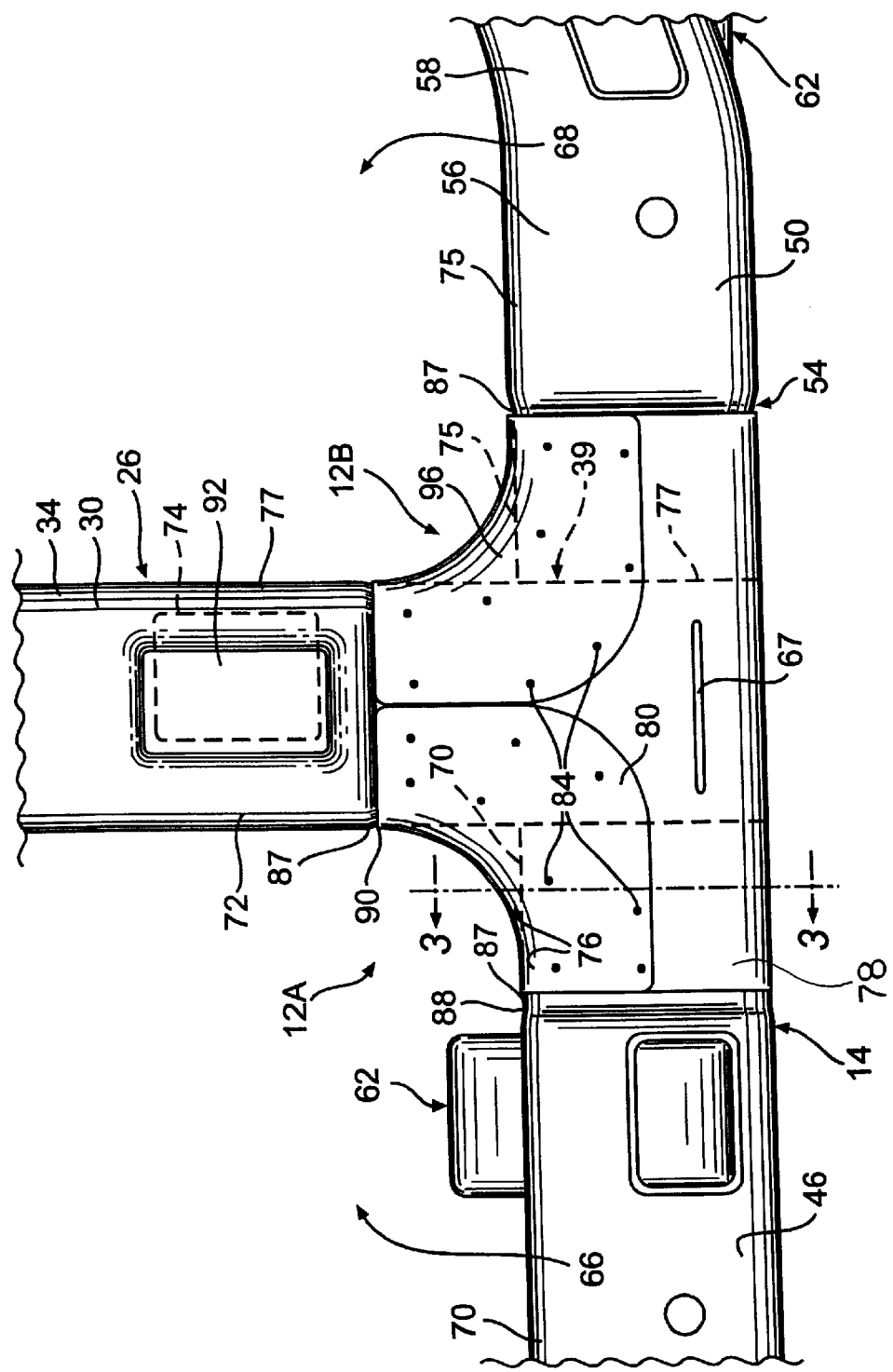
FIG. 2 is an enlarged view of a pair of door seal interface structures of the space frame.

FIG. 2 shows an enlarged view of a portion of the space frame 10 in the vicinity of the joint 39 formed between the leg portion 34 of the cross member 26 and the lower side rail 14 provided by the hydroformed members 46, 50 (which are connected at joint 54). The structure and construction of the various joints of the space frame 10 (including joints 24, 37, 39, 42 and 44) are shown and described in detail in commonly assigned co-pending non-provisional patent application Ser. No. 09/517,750 filed Mar. 3, 2000, the entirety of which is hereby incorporated by reference into the present application. The structure and construction of joint 39 will be considered briefly in the present application to facilitate understanding of the associated door seal interface structure.

To form the joint 39, an upper wall portion of the hydroformed member 46 is cut out (preferably by laser cutting) and removed to form an upwardly facing pillar-receiving opening sized to receive a free end of the leg portion 34 therein. In the embodiment of the joint 39 shown in FIG. 2, the portions of the hydroformed members 26, 46 forming the joint 39 have rectangular cross sections so that when the leg portion 34 is received within the opening of the rail member 46, a pair of opposing vertically extending laterally spaced wall portions of the leg portion 34 are inside of and adjacent a pair of opposing vertically extending laterally spaced wall portions of the hydroformed rail member 46. A weld opening 67 is formed in at least one vertically extending wall portion of the rail member 46. Welding material (not shown) is disposed between edge portions of the weld opening 67 and an adjacent vertically extending wall of the leg portion 34 (preferably by puddle welding) and between the outer edges of the pillar-receiving opening in the rail portion 46 and the adjacent side wall portions of the leg portion 34 (preferably by mig welding) to secure the leg portion 34 in the pillar-receiving opening to form the joint 39.

The rail portion 46 and the pillar portion 34 define a pair of associated door seal-engagable surfaces 70 and 72, respectively, which are adjacent to one another and generally angularly related in the vicinity of the joint 39 where the end of the leg portion 34 enters the pillar-receiving opening formed in the rail portion 46. These generally outwardly facing surfaces 70, 72 are essentially horizontal and essentially vertical, respectively, and therefore are angularly related in this example at an essentially right angle in the vicinity of the joint 39. It would be difficult to construct a vehicle door having a peripheral seal about its periphery that could sealingly engage a pair of door seal-engagable surfaces of the door opening that form a sharp angle such as a ninety degree angle therebetween.

The space frame 10 includes several door seal interface structures 12 which sealingly engage an associated door seal in the vicinity of an associated space frame joint. Each particular instance of a door seal interface structure 12 is identified by a reference letter following the reference numeral 12. The several door seal interface structures 12 (specifically, 12A, 12B, 12C and 12D) are of generally similar construction (differing only slightly in shape and dimensions) and can be understood from a detailed examination of the door seal interface structure 12A.

The door seal interface structure 12A is shown in enlarged view in FIG. 2. The door seal interface structure 12A is comprised of the hydroformed rail portion 46 of the space frame 10, the pillar-forming leg portion 34 of the space frame, and a transition structure 73 mounted therebetween. The transition structure 73 generally includes an arcuate generally outwardly facing transition surface portion 76 and a space frame mounting portion 78.

Figure 3:
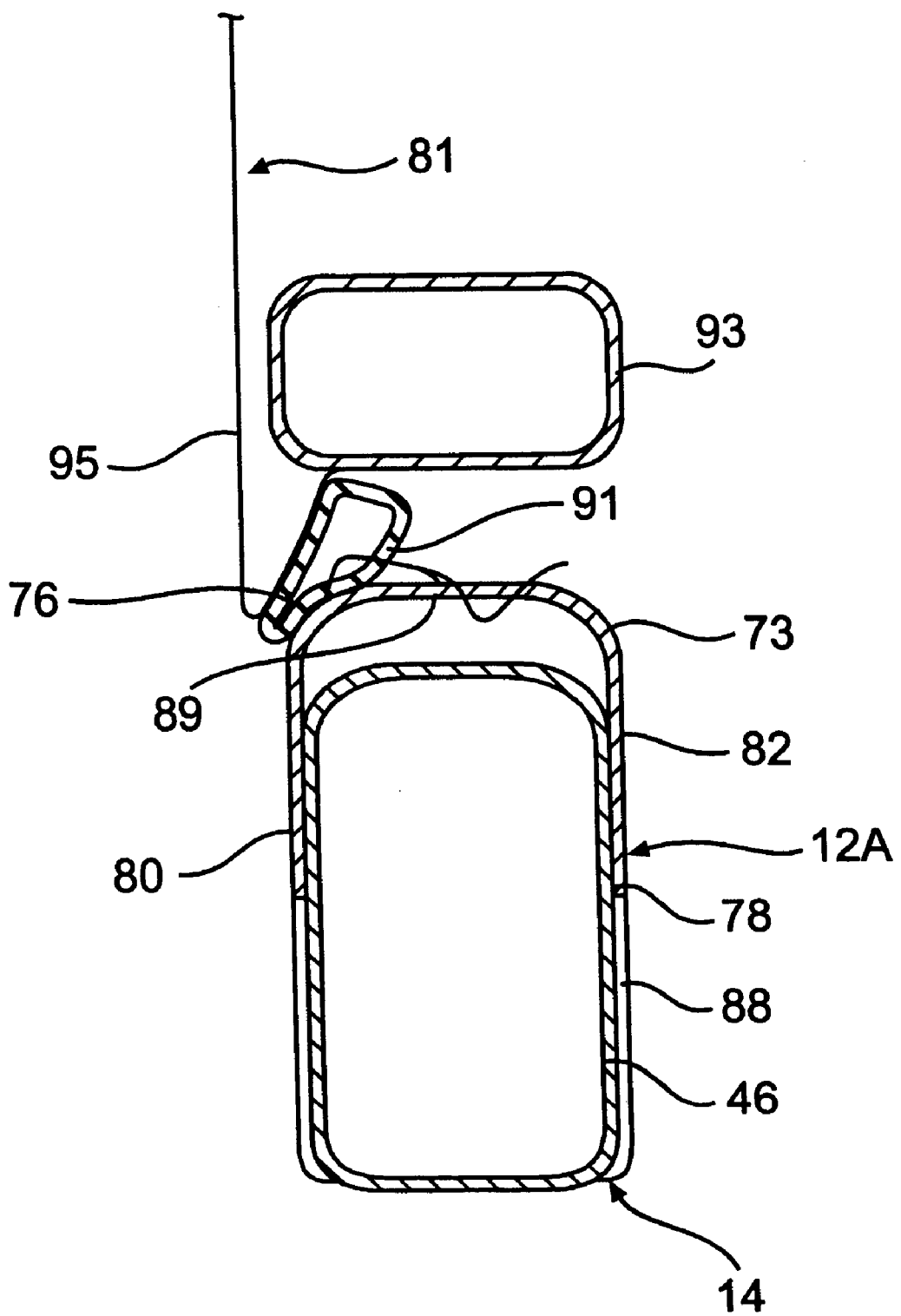
FIG. 3 is a cross-sectional view taken through the line 3—3 in FIG. 2.

Preferably the transition structure 73 is a metallic structure made from a sheet of metal by stamping or by other suitable method. The structure of the transition structure 73 and the manner in which it is mounted on the rail and pillar portions 46 and 34, respectively, to form the door seal interface structure 12A can best be understood from the cross sectional view of FIG. 3. Specifically, FIG. 3 shows the mounting of the transition structure 73 on the rail portion 46. The pillar portion 34 is not visible in FIG. 3, but the mounting of the transition structure 73 to portion 34 can be understood from FIG. 3. The transition structure 73 has an inverted generally U-shaped cross-section. The mounting portion 78 comprises a pair of side wall portions 80, 82 extending integrally from a central wall portion 89. The side wall portions 80, 82 are spaced to receive portions of the frame members 46, 26 when the transition structure 73 is mounted in the vicinity of the joint 39 (as shown in FIGS. 1, 2 and 3).

The transition structure 73 is rigidly fixed to the space frame members 46, 26, preferably by a series of one-sided spot welds indicated schematically at 84, although any appropriate method of affixation can be used. It can be appreciated that portions of the hydroformed space frame members 46, 26 are of reduced diameter (in areas generally designated 88 and 90, respectively) to accommodate the thickness of the walls 80, 82, 89 of the transition structure 73. The transition surface 76 of the transition structure 73 provides a generally outwardly facing, arcuate transition surface between the adjacent door seal-engagable surfaces 70, 72 on the members 46, 26, respectively. Preferably the depth of the hydroformed recesses 88, 90 (best appreciated from FIG. 3 which shows the recess 88) are approximately equal to the thickness of the walls 80, 82, 89 so that the exterior surfaces of the wall portions 80, 82, 89 are approximately flush with the adjacent exterior surface portions of the hydroformed members 16, 26. Preferably a thumbgrade putty (not shown) is used to fill in any gaps 87 that may remain between the transition structure 73 and either of the space frame members 46, 26, particularly along the area that will sealingly engage the door seal when the door is closed.

FIG. 3 shows a fragmentary portion of the front vehicle door 81 in a closed position to illustrate the sealing engagement between the transition surface portion 76 of the transition structure 73 and a door seal 91 mounted generally on the periphery of the door 81. The door 81 includes a tubular metallic door frame member 93 and a sheet metal structure 95 rigidly secured to the door frame member 93 by welding or by any other appropriate method. The door seal 91 is secured to a generally inwardly facing lower surface of the vehicle door 81.

It can also be understood from, for example, FIGS. 1 and 2 that a pair of embossed pads 92 are hydroformed into the pillar portion 34 of the U-shaped member 26 to receive a pair of hinges 74 to mount a rear vehicle door (associated with door opening 68). It can be appreciated from FIG. 1 that similar pads 92 are hydroformed into the A pillar 20 for the hinges of the front vehicle door.

It can be appreciated from FIGS. 1 and 2 that the interface structure 12B is also formed in the vicinity of joint 39 but is mounted in the door opening 68. The door seal interface structure 12B includes the pillar portion 34 of the space frame 10, a rail portion of the space frame 10 formed by the connected rail members 46 and 50, and a transition structure 96. The transition structure 96 is essentially identical to the transition structure 73 and is mounted to the space frame 10 in a manner similar to the mounting of the transition structure 73.

The door seal interface structures 12C and 12D each include the transition structures 121, 123, respectively, (see FIG. 1). The transition structures 121, 123 are of similar construction to the transition structure 73 (although they may differ in shape and/or dimensions) and are mounted on the space frame 10 in essentially the same manner as the transition structure 73 of the door seal interface structure 12A. The door seal interface structure 12C is comprised of the pillar-forming portion 20 of the upper longitudinal member 16, the rail member 46, and the transition structure 121. The transition structure 121 is mounted in the vicinity of the joint 24 between the pillar-forming portion 20 of the upper longitudinal member 16 and the rail member 46 to form the interface structure 12C. Similarly, the door seal interface structure 12D is comprised of the pillar-forming portion 36 of the cross member 28, the rail member 50, and the transition structure 123. The transition structure 123 is mounted in the vicinity of the joint 37 between the pillar-forming portion 36 of the cross member 28 and the rail member 50 to form the interface structure 12D. The joints 24, 37 are of essentially identical construction to the joint 39.

The transition structure 123 of the door interface structure 12D (see FIG. 1) provides an arcuate, generally outwardly facing transition surface 97 between the arcuate door seal-engagable surface 81 on the arched, wheel-well forming portion 58 of the rail member 50 and the surface 79 of the pillar portion 36. It can be understood that because this pair of generally outwardly facing surfaces 79, 81 is generally perpendicular in the vicinity of the joint 37, a door seal cannot easily conform to this angle and that therefore the transition surface 97 provided by a transition structure 123 is necessary to seal a closed rear door.

Figure 6:
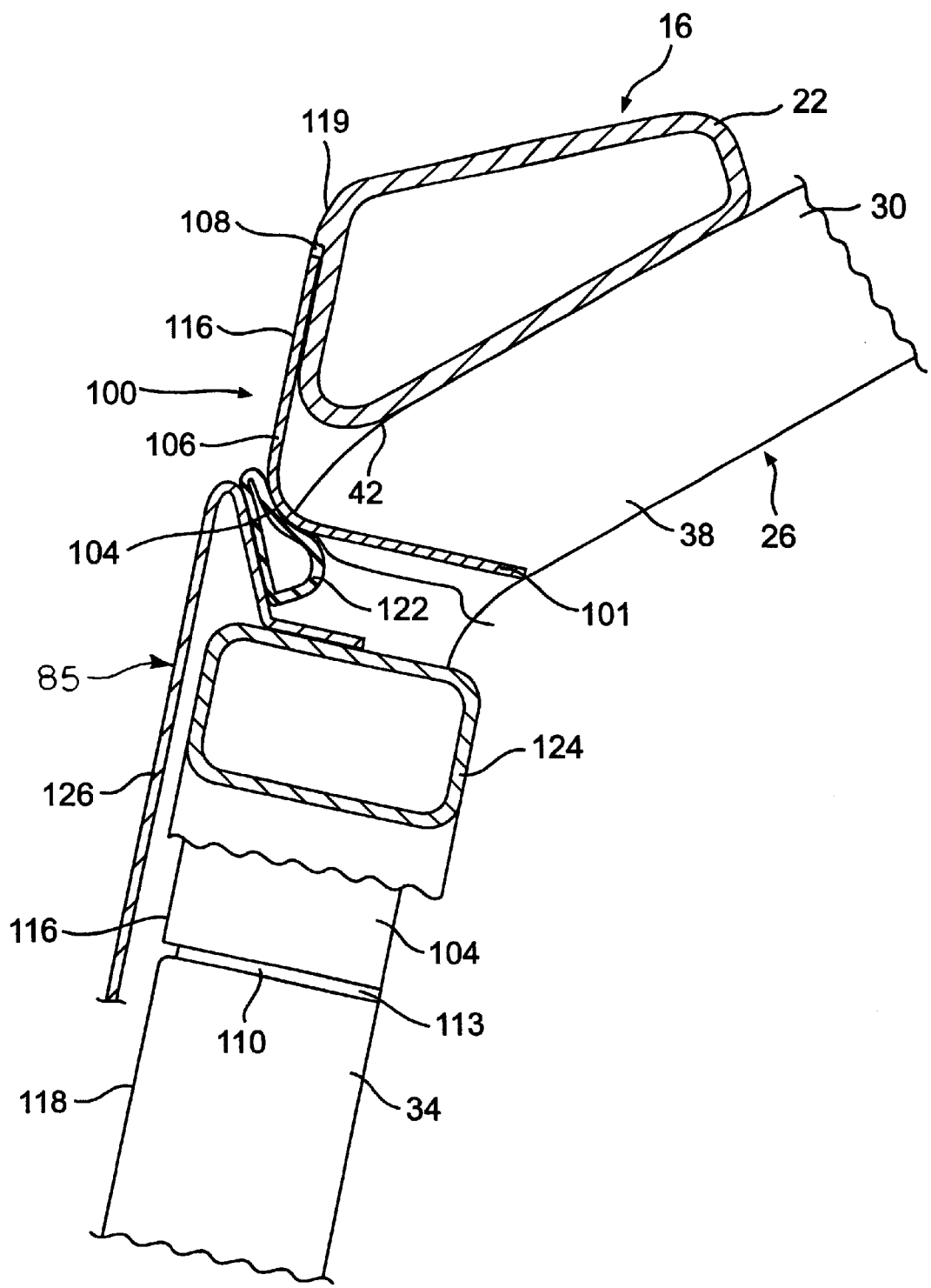
FIG. 6 is a cross sectional view taken through the line 6—6 of FIG. 4.

FIGS. 4–6 show enlarged views of the joint 42 formed between the juncture 38 of the hydroformed cross member 26 and the longitudinally extending rail portion 22 of the upper longitudinal member 16. As best appreciated from FIGS. 5 and 6, the joint 42 is formed by welding the upper longitudinal member 16 in generally overlying relation to the juncture 38 of the cross member 26. The structure of the joint 42 is shown and described in detail in the above incorporated '750 non-provisional patent application. Another embodiment of a door seal interface structure 100 is provided in the vicinity of the joint 42 and is comprised of a transition structure 101, the B pillar-forming leg 34 of the cross member 26 and the longitudinally extending rail portion 22 of the upper longitudinal member 16.

The transition structure 101 is mounted in the vicinity of the joint 42 and is preferably a metallic structure having a pair of generally outwardly facing arcuate transition surface portions 102, 104 disposed generally on opposite rounded edges of a central wall portion 106. The transition structure 101 is preferably a single-piece stamped sheet metal structure, although the transition structure 101 can be of multi-piece construction. The transition structure 101 can be constructed of any appropriate metallic material and can be shaped or formed by any appropriate method. The transition structure 101 is generally disposed within hydroformed recesses 108, 110 formed in the hydroformed members 16, 26, respectively.

The transition structure 101 is preferably secured to the members 16, 26 by a series of one-sided spot welds 112 shown schematically in FIG. 4, although any appropriate affixation method can be utilized, including the use of any appropriate welding method or the use of any appropriate adhesive. Preferably, a thumb grade putty is used to fill in any gaps 113 between the transition structure 101 and associated hydroformed members 16, 26 that may be present after the transition structure 101 is secured to the members 16, 26.

Preferably, the depth of each hydroformed recess 108, 110 is approximately equal to the thickness of the wall 106 of the transition structure 101 so that the exterior surfaces of the wall portion 106 and the arcuate transition surfaces 102 and 104 are each flush with the adjacent exterior surface portions of the hydroformed members 16, 26. This relation can be best appreciated from FIG. 6 which shows that an outwardly facing exterior surface 116 of the transition structure 101 is flush with exterior portions 118, 119 of the hydroformed members 26, 16, respectively. Each arcuate transition surface 102, 104 of the transition structure 101 thus provides an arcuate transition between the door seal engaging surfaces of the associated rail and pillar. The arcuate transition surfaces 102, 104 sealingly engage an arcuate portion of the door seal of a closed vehicle door.

FIG. 6 shows a fragmentary portion of the rear vehicle door 85 in a closed position to illustrate the sealing engagement between the generally outwardly facing transition surface portion 104 of the transition structure 101 and a door seal 122 mounted generally on the periphery of the door 85. The door 85 includes a tubular metallic door frame member 124 and a sheet metal structure 126 rigidly secured to the door frame member 124 by welding or by other appropriate method. The door seal 122 is secured to an inwardly facing upper surface of the vehicle door 85.

A door seal interface structure 127 (see FIG. 1) is formed in the door opening 68. The interface structure 127 includes a transition structure 125, the pillar forming portion 36 of the cross member 28 and the longitudinally extending portion 22 of the upper longitudinal member 16. The transition structure 125 is mounted between the hydroformed members 16, 28 in the vicinity of the joint 44. The structure of the joint 44 is essentially identical to the joint 42 and will not be considered in detail.

The construction and mounting of the transition structure 125 to form the interface structure 127 can be understood from examining the manner in which the transition structure 101 is mounted in the vicinity of the joint 42 to form the interface structure 100 (see FIGS. 4–6) and will not be considered in detail. It can be understood that the transition structure 125 is constructed similarly to the forward half of the transition structure 101.

Other preferred embodiments of door seal interface structures are shown in FIGS. 7–10. FIGS. 7 and 8 show a door seal interface structure 212 that includes a transition structure 214 mounted between a hydroformed lower side rail portion 216 and a hydroformed pillar portion 218 (which can be a B or C pillar, for example). Wall portions 220, 222 of the transition structure 214 are secured (preferably by one-sided spot welding or other appropriate method) within recesses 224, 226 hydroformed within the rail portion 216 and within the pillar portion 218.

The transition structure 214 provides an outwardly facing transition surface 228 between the outwardly facing door seal engaging surfaces 230, 232 on the rail and pillar portions 216, 218, respectively. These seal engaging surfaces 230, 232 are essentially vertically extending and face outwardly of the space frame. The surface portions 228, 230, 232 sealingly engage a primary door seal 234 that seals the periphery of a closed vehicle door 236 (shown in fragmentary view in FIG. 8). The door 236 includes inner and outer wall portions 238, 240 which are preferably formed of a stamped sheet metal and which are joined together by welding or other appropriate method as, for example, along seam 242.

Preferably, the primary door seal 234 is sealingly engaged with the surface portions 228, 230, 232 by being fixedly secured thereto (as, for example, by fasteners or by an appropriate adhesive, or both) and the door 236 moves in and out of sealing engagement with the primary door seal 234 as the door 236 is closed and opened. Preferably the seal engaging surface portions 228, 230, 232 of the door seal interface structure 212 are essentially vertical. A putty (not shown to more clearly show the structure of the door seal interface structure) or other appropriate material is used to fill gaps 245.

An upper corner portion 246 of the side rail portion 216 (as viewed from the perspective of the cross sectional view of FIG. 8) is of sloped and a corresponding upper and inner portion 248 of the transition structure 214 is recessed (see FIG. 8) so that the threshold of the vehicle doorway is relatively narrow in the cross vehicle direction. This narrowing of the threshold of the doorway makes it easier for the feet of a person entering or exiting the vehicle through the doorway to clear the threshold.

Figure 9:
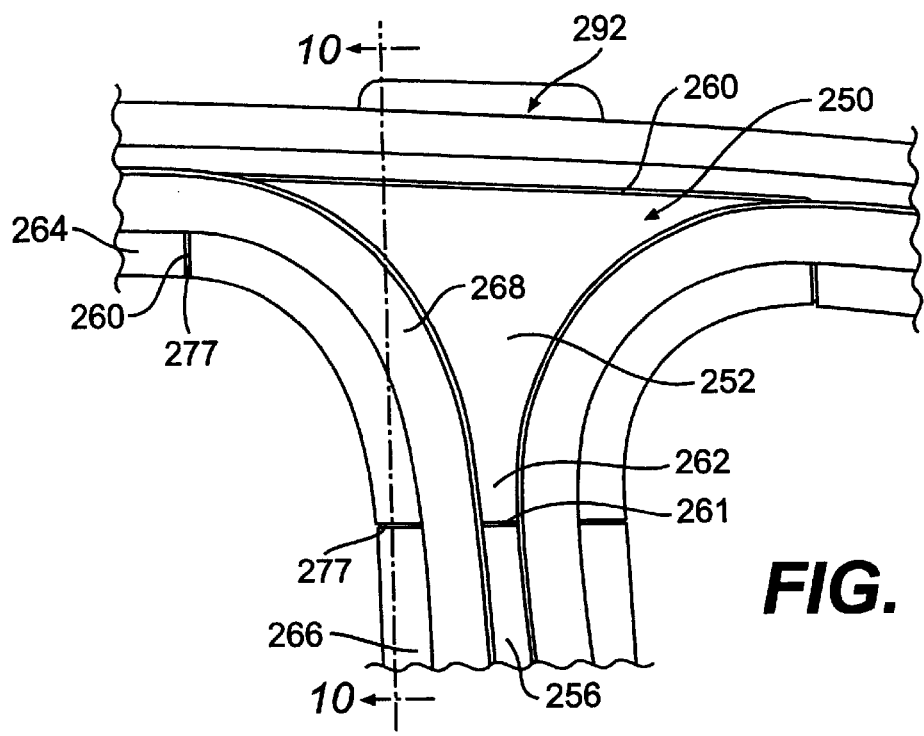
FIG. 9 is a view similar to the view if FIG. 4 showing another embodiment of a door seal interface structure of a space frame.
Figure 10:
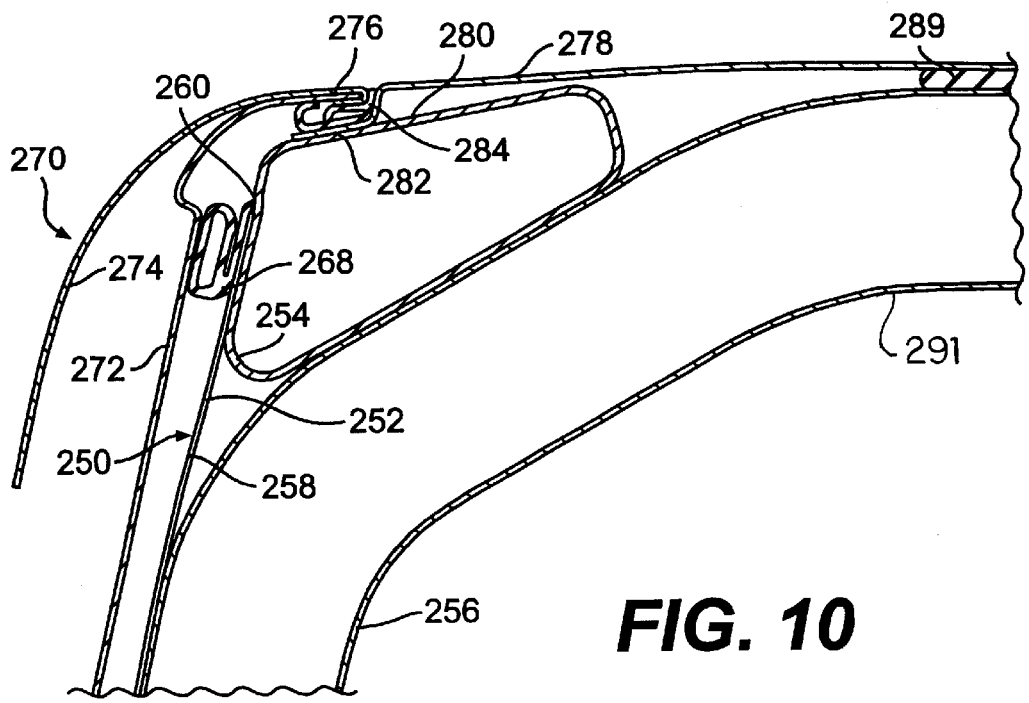
FIG. 10 is a cross-sectional view taken through the line 10—10 in FIG. 9.

FIGS. 9 and 10 show two views of a door seal interface structure 250 that includes a transition structure 252 mounted between a hydroformed upper side rail portion 254 and a hydroformed pillar portion 256 (which can be a B or C pillar, for example). A wall portion 258 of the transition structure 252 is secured (preferably by one-sided spot welding) within a recesses 260, 261 (see FIGS. 9 and 10, respectively) hydroformed within the rail and pillar portions 254, 256 respectively, for reasons described above. The transition structure 252 defines a generally outwardly facing transition surface 262 between generally outwardly facing surface portions 264, 266 on the rail and pillar portions 254, 256, respectively. The surface portions 262, 264, 266 sealingly engage a primary door seal 268 that seals the periphery of a closed vehicle door 270 (shown in fragmentary view in FIG. 10). The door 270 includes inner and outer wall portions 272, 274, respectively, which are preferably formed of a stamp sheet metal and which are joined together by welding or other appropriate method as, for example, along seam 276.

Preferably, the primary door seal 268 is fixedly secured to the surface portions 262, 264, 266 and the door 270 moves in and out of sealing engagement with the primary seal 268 as the door 270 is closed and opened. As best appreciated from FIG. 10, preferably the seal engaging surface portions 262, 264, 266 are angled slightly inwardly from bottom to top as best seen in FIG. 10, but for purposes of the present discussion, because their angular deviation from vertical if slight, the surface portions 262, 264, 266 will be considered to be essentially vertical. Preferably a putty (not shown to more clearly show the structure of the door seal interface structure) or other appropriate material is used fill in gaps 277.

As shown in FIG. 10, a roof panel 278 (not shown in FIG. 9 to more clearly illustrate the door seal interface structure 250) is mounted along an upwardly facing surface 280 of the hydroformed roof rail portion 254. Preferably the roof panel 278 is constructed of a sheet metal that has been shaped by stamping and is secured to the rail portion 254 by welding or other appropriate method along a seam or interface 282. As can appreciated from FIG. 10, a secondary door seal 284 is fixedly secured along an upper peripheral portion of a door opening for the door 270. The secondary door seal 284 is shown in FIG. 10 mounted along an edge of the roof panel 278. The secondary door seal 284 sealingly engages an upper portion of the vehicle door when the door is closed. A resilient material 289 is mounted between the roof panel 278 and the cross portion 291 of the tubular hydroformed cross member that provides the tubular hydroformed rail portion 256. The resilient material 289 can be any appropriate synthetic rubber-like polymeric or elastomeric material that prevents roof flutter, particularly during high speed driving.

It can be appreciated from FIGS. 7–10 that the surface portions 228, 230, 232 (FIGS. 7 and 8) are essentially coplanar in the vicinity of the joint 290 and that the surface portions 262, 264, 266 (FIGS. 9 and 10) are essentially coplanar in the vicinity of the joint 292. That is, each transition structure defines a planar surface that forms a transition between outwardly facing, angularly related, essentially planar surface portions of the associated rail and pillar portions of each door seal interface structure.

It can be understood that the embodiment of the space frame shown in the figures and the embodiments of the door seal interface structures shown in the figures are exemplary only and are not intended to limit the scope of the invention. Thus, it can be understood that although the door seal interface structures constructed according to the principles of the present invention are particularly well-suited to forming door seal-engagable transition surfaces between a pair of hydroformed members that are connected to one another at a joint, this particular use of the door seal interface structures is intended to be illustrative only and is not intended to limit the scope of the invention. It is, for example, contemplated to construct a door seal interface structure to provide a door seal-engagable arcuate transition surface in the vicinity of a joint between a hydroformed member and a non-hydroformed member (such as a metallic stamped member). Similarly, it is contemplated to construct a door seal interface structure to provide a door seal-engagable arcuate transition surface in the vicinity of a joint between two non-hydroformed members of a space frame.

It is within the scope of the invention to construct wide range of transition structures suitable for mounting with respect to a wide range of space frame joints. Thus application of the principles of the present invention is not limited the two types of joints (joints 39 and 42, for example) used to illustrate the invention.

It can also be understood that although the door seal interface structures shown and described above are utilized to provide transition surfaces between angularly related rail and pillar surfaces that are essentially perpendicular, this is illustrative only and not intended to limit the scope of the invention. It is within the scope of the invention, for example, to construct a door seal interface structure to provide a transition surface between pillar and rail surfaces that form a wide range of angles therebetween.

Thus, it can be understood that while the invention has been disclosed and described with reference with a limited number of embodiments, it will be apparent that variations and modifications may be made to each embodiment without departing from the spirit and scope of the invention. Therefore, the following claims are intended to cover all such modifications, variations, and equivalents thereof in accordance with the principles and advantages noted herein.

What is claimed is:

1. A door seal interface structure for a motor vehicle space frame, said door seal interface structure comprising:

a longitudinally extending hydroformed tubular rail portion;

a hydroformed tubular pillar portion connected at a joint to said rail portion, said rail portion and said pillar portion providing respective surfaces constructed and arranged to sealingly engage a door seal to seal a peripheral portion of a closed vehicle door, said surfaces being angularly related to one another in the vicinity of said joint; and a transition structure being distinct and separately formed with respect to said rail portion and said pillar portion and being mounted on said rail portion and said pillar portion and positioned over said rail portion and said pillar portion at said joint, said transition structure providing a transition surface that provides a transition between said surface of said rail portion and said surface of said pillar portion, said transition surface being constructed and arranged to sealingly engage a portion of said door seal and thereby provide a door seal-engagable surface in the vicinity of the joint.

2. A door seal interface structure as defined in claim 1 wherein said rail portion forms part of a lower side rail.

3. A door seal interface structure for a motor vehicle space frame, said door seal interface structure comprising:

a longitudinally extending hydroformed tubular rail portion;

a hydroformed tubular pillar portion connected at a joint to said rail portion, said rail portion and said pillar portion providing respective surfaces constructed and arranged to sealingly engage a door seal to seal a peripheral portion of a closed vehicle door, said surfaces being angularly related to one another in the vicinity of said joint; and a transition structure being mounted on said rail portion and said pillar portion in the vicinity of said joint, said transition structure providing a transition surface that provides a transition between said surface of said rail portion and said surface of said pillar portion, said transition surface being constructed and arranged to sealingly engage a portion of said door seal and thereby provide a door seal-engagable surface in the vicinity of the joint, wherein said rail portion forms part of a lower side rail, and wherein said rail portion surface, said pillar portion surface and said transition surface are essentially coplanar in the vicinity of said joint.

4. A door seal interface structure as defined in claim 3 wherein said door seal-engagable rail portion surface is essentially horizontal in the vicinity of said joint and said door seal-engagable pillar portion surface is essentially vertical in the vicinity of said joint.

5. A door seal interface structure as defined in claim 2 wherein said transition surface is arcuate between said rail portion surface and said pillar portion surface.

6. A door seal interface structure as defined in claim 5 wherein said door seal-engagable rail portion surface is essentially horizontal in the vicinity of said joint and said door seal-engagable pillar portion surface is essentially vertical in the vicinity of said joint.

7. A door seal interface structure as defined in claim 1 wherein said rail portion forms part of an upper longitudinal rail.

8. A door seal interface structure as defined in claim 7 wherein said rail portion surface, said pillar portion surface and said transition surface are essentially coplanar in the vicinity of said joint.

9. A door seal interface structure as defined in claim 8 wherein said door seal-engagable rail portion surface is essentially vertical in the vicinity of said joint and said door seal-engagable pillar portion surface is essentially vertical in the vicinity of said joint.

10. A door seal interface structure as defined in claim 7 wherein said transition surface is arcuate between said rail portion surface and said pillar portion surface.

11. A door seal interface structure as defined in claim 10 wherein said door seal-engagable rail portion surface is essentially horizontal in the vicinity of said joint and said door seal-engagable pillar portion surface is essentially vertical in the vicinity of said joint.

12. A door seal interface structure as defined in claim 1, said transition structure further comprising a second transition surface, said rail portion providing a second door seal-engagable rail portion surface constructed and arranged to sealingly engage a second door seal to seal a second closed vehicle door and said pillar portion providing a second door seal-engagable pillar portion surface constructed and arranged to sealingly engage said second door seal to seal said second closed vehicle door, said second rail portion and pillar portion surfaces being angularly related to one another in the vicinity of said joint; and said second transition surface portion forming a transition surface between said second rail and pillar portion surfaces and being constructed and arranged to sealingly engage a portion of said second door seal to seal said second closed vehicle door and thereby provide a second door seal-engagable surface in the vicinity of said the joint.

13. A door seal interface structure as defined in claim 12 wherein said rail portion forms part of an upper longitudinal rail.

14. A door seal interface structure as defined in claim 13 wherein each said transition surface defines an arcuate surface between the associated rail pillar portion surfaces.

15. A door seal interface structure as defined in claim 14 wherein each said door seal-engagable rail portion surface is essentially horizontal in the vicinity of said joint and each said door seal-engagable pillar portion surface is essentially vertical in the vicinity of said joint.

16. A door seal interface structure as defined in claim 13 wherein each said rail portion surface, the associated pillar portion surface and the associated transition surface are essentially coplanar in the vicinity of said joint.

17. A door seal interface structure for a motor vehicle space frame, said door seal interface structure comprising:

a longitudinally extending hydroformed tubular rail portion;

a hydroformed tubular pillar portion connected at a joint to said rail portion, said rail portion and said pillar portion providing respective surfaces constructed and arranged to sealingly engage a door seal to seal a peripheral portion of a closed vehicle door, said surfaces being angularly related to one another in the vicinity of said joint; and a transition structure being mounted on said rail portion and said pillar portion in the vicinity of said joint, said transition structure providing a transition surface that provides a transition between said surface of said rail portion and said surface of said pillar portion, said transition surface being constructed and arranged to sealingly engage a portion of said door seal and thereby provide a door seal-engagable surface in the vicinity of the joint, wherein said joint is formed by a lower end of said pillar portion being received in an opening formed in an upper surface of said tubular lower side rail portion.

18. A door seal interface structure as defined in claim 17, wherein said lower end of said pillar portion engages an interior lower surface of said tubular lower side rail portion.

19. A door seal interface structure as defined in claim 1, wherein each of said rail portion and said pillar portion is defined by an outwardly deformed tubular, metallic wall fixed into a predetermined exterior surface configuration.

20. A door seal interface structure as defined in claim 5, wherein said arcuate surface is a continuous surface extending from said rail portion to said pillar portion and constructed and arranged to sealingly engage a door seal.

21. A door seal interface structure as defined in claim 12, wherein each transition surface defines an arcuate surface that is a continuous surface extending from said respective rail portion to said respective pillar portion and constructed and arranged to sealingly engage a door seal.

22. A door seal interface structure as defined in claim 12, wherein said transition structure is a two-piece assembly.

23. A door seal interface structure as defined in claim 22, wherein each of said two-piece assembly is a one-piece, unitary member.

24. A door seal interface structure as defined in claim 1, wherein said pillar portion includes a recessed section at said joint connecting said pillar portion and said rail portion, and said rail portion includes a recessed section at said joint connecting said pillar portion and said rail portion.

25. A door seal interface structure for a motor vehicle space frame, said door seal interface structure comprising:

a longitudinally extending hydroformed tubular rail portion;

a hydroformed tubular pillar portion connected at a joint to said rail portion, said rail portion and said pillar portion providing respective surfaces constructed and arranged to sealingly engage a door seal to seal a peripheral portion of a closed vehicle door, said surfaces being angularly related to one another in the vicinity of said joint; and a transition structure being mounted on said rail portion and said pillar portion in the vicinity of said joint, said transition structure providing a transition surface that provides a transition between said surface of said rail portion and said surface of said pillar portion, said transition surface being constructed and arranged to sealingly engage a portion of said door seal and thereby provide a door seal-engagable surface in the vicinity of the joint, said pillar portion includes a recessed section at said joint connecting said pillar portion and said rail portion, said rail portion includes a recessed section at said joint connecting said pillar portion and said rail portion, and wherein said transition structure is mounted within and covers said recessed section of said pillar portion, and said transition structure is mounted within and covers said recessed section of said rail portion.

26. A method of forming a door seal interface structure for a motor vehicle space frame comprising:

forming a longitudinally extending hydroformed tubular rail portion by a method comprising, providing a tubular metallic blank having a tubular metallic wall;

placing the tubular metallic blank into a die cavity of a die assembly, the die cavity having die surfaces, and providing a high pressure fluid into an interior of the blank to expand the metallic wall of the blank outwardly into conformity with the surfaces of the die cavity to define portions of predetermined exterior surface configurations;

forming a hydroformed tubular pillar portion by a method comprising, providing a tubular metallic blank having a tubular metallic wall;

placing the tubular metallic blank into a die cavity of a die assembly, the die cavity having die surfaces, and providing a high pressure fluid into an interior of the blank to expand the metallic wall of the blank outwardly into conformity with the surfaces of the die cavity to define portions of predetermined exterior surface configurations;

forming a transition structure distinctly and separately with respect to the rail portion and the pillar portion;

connecting the rail portion and the pillar portion at a joint to form part of a vehicle space frame, the rail portion and the pillar portion providing respective surfaces constructed and arranged to sealingly engage a door seal to seal a peripheral portion of a closed vehicle door, the surfaces being angularly related to one another in the vicinity of the joint; and mounting the transition structure on the rail portion and the pillar portion and positioned over the rail portion and the pillar portion at the joint, the transition structure providing a transition surface that provides a transition between a surface of the rail portion and a surface of the pillar portion, the transition surface being constructed and arranged to sealingly engage a portion of a door seal and thereby provide a door seal-engageable surface in the vicinity of the joint.

27. A method according to claim 26, further comprising:

mounting a door on the space frame having a door seal that engages the rail portion and pillar portion surface and engages the transition surface between the rail portion surface and the pillar portion surface.

28. A method according to claim 20, wherein the forming of the rail portion includes forming a recessed section, the forming of the pillar portion includes forming a recessed section, and the connecting the rail portion and the pillar portion to form the joint includes connecting the recessed section of the rail portion and the recessed section of the pillar portion to form the joint.

* * * * *